United States Patent [19]

Iizuka et al.

[11] 4,364,445

[45] Dec. 21, 1982

[54] TRANSMISSION DEVICE FOR A VEHICLE

[75] Inventors: Yoshitoku Iizuka, Urawa; Kiyokazu Ohkubo, Wako, both of Japan

[73] Assignee: Honda Giken Kogyo Kabushiki Kaisha, Tokyo, Japan

[21] Appl. No.: 178,941

[22] Filed: Aug. 15, 1980

[30] Foreign Application Priority Data

Aug. 29, 1979 [JP] Japan ................. 54-118655[U]

[51] Int. Cl.³ .................. B60K 41/000; F16D 47/002; F16H 45/000
[52] U.S. Cl. ................................. 180/70 R; 180/230; 192/48.5
[58] Field of Search .................. 180/70 R, 71, 70 MS, 180/73 R, 220, 221, 219; 280/200, 236, 238; 192/48.5, 48.3, 48.1, 105 CD; 74/7 C, 7 E, 10.45, 64, 112, 113, 114, 322, 323, 333, 356, 398, 399, 402, 403, 412 R, 413

[56] References Cited

U.S. PATENT DOCUMENTS 2,172,780  9/1939  Whitney et al. ............... 192/48.3 X
4,067,243  1/1978  Kurata et al. ................. 180/70 R X Primary Examiner—Joseph F. Peters, Jr.
Assistant Examiner—M. J. Hill
Attorney, Agent, or Firm—Armstrong, Nikaido, Marmelstein & Kubovcik

[57] ABSTRACT

A transmission device in which a centrifugal starting clutch is in a casing mounted on a crank shaft of an engine. A multiple plate type speed change clutch is mounted on a speed change input shaft. The starting clutch has an output member operatively connected to its input member through a reduction gear train. The speed change clutch is interposed between the starting clutch and the reduction gear train. The starting clutch is immersed into lubricating oil in the casing, whereas the speed change clutch is totally positioned above the surface of lubricating oil.

8 Claims, 2 Drawing Figures

TRANSMISSION DEVICE FOR A VEHICLE

BACKGROUND OF THE INVENTION

The present invention relates to a transmission device for motorcycles, two wheeled vehicles and other vehicles and more particularly to a transmission device wherein a centrifugal clutch is mounted on a crank shaft of the engine. A multiple plate type speed change clutch is mounted on a speed change input shaft, and an output member of the centrifugal clutch is connected to an input member of the speed change clutch through a reduction gear train.

In a transmission device of the foregoing species, the centrifugal clutch is in its half-set state for a relatively long period of time in order that the vehicle may be started smoothly. As a result, a large amount of frictional heat is generated, which requires that the clutch must always be cooled. On the other hand, the speed change clutch is in its half-set state for a very short period of time, because the speed change clutch is momentarily opened and closed when the speed change gear is switched. However, a turning torque of the crank shaft increased by the reduction gear train, must be positively transmitted to the speed change input shaft through a frictional connecting portion without any substantial slippage.

SUMMARY OF THE INVENTION

It is an object of the present invention to provide a small transmission device which can meet the aforementioned requirements.

In accordance with the present invention, there is provided a transmission device in a vehicle, with a centrifugal clutch in a casing mounted on a crank shaft of the engine. A multiple plates type speed change clutch in the casing is mounted on a speed change input shaft. The centrifugal clutch has an output member operatively connected to its input member through a reduction gear train. The speed change clutch is interposed between the centrifugal clutch and the reduction gear train. The centrifugal clutch is partly immersed into lubricating oil within the casing, whereas the speed change clutch is totally positioned above the surface of the lubricating oil.

DESCRIPTION OF THE PREFERRED EMBODIMENT

Figure 1:
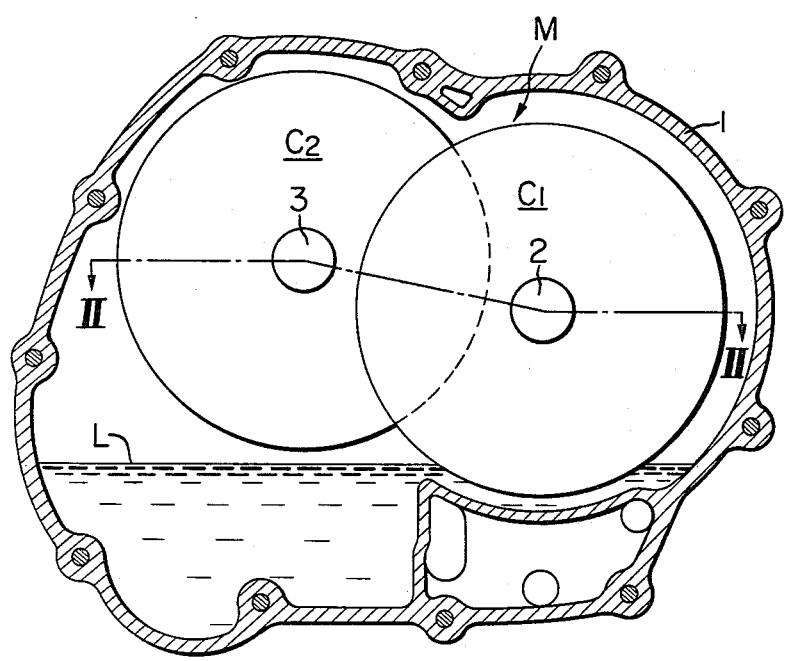
FIG. 1 is a cross sectional view of one embodiment of the device in accordance with the present invention.
Figure 2:
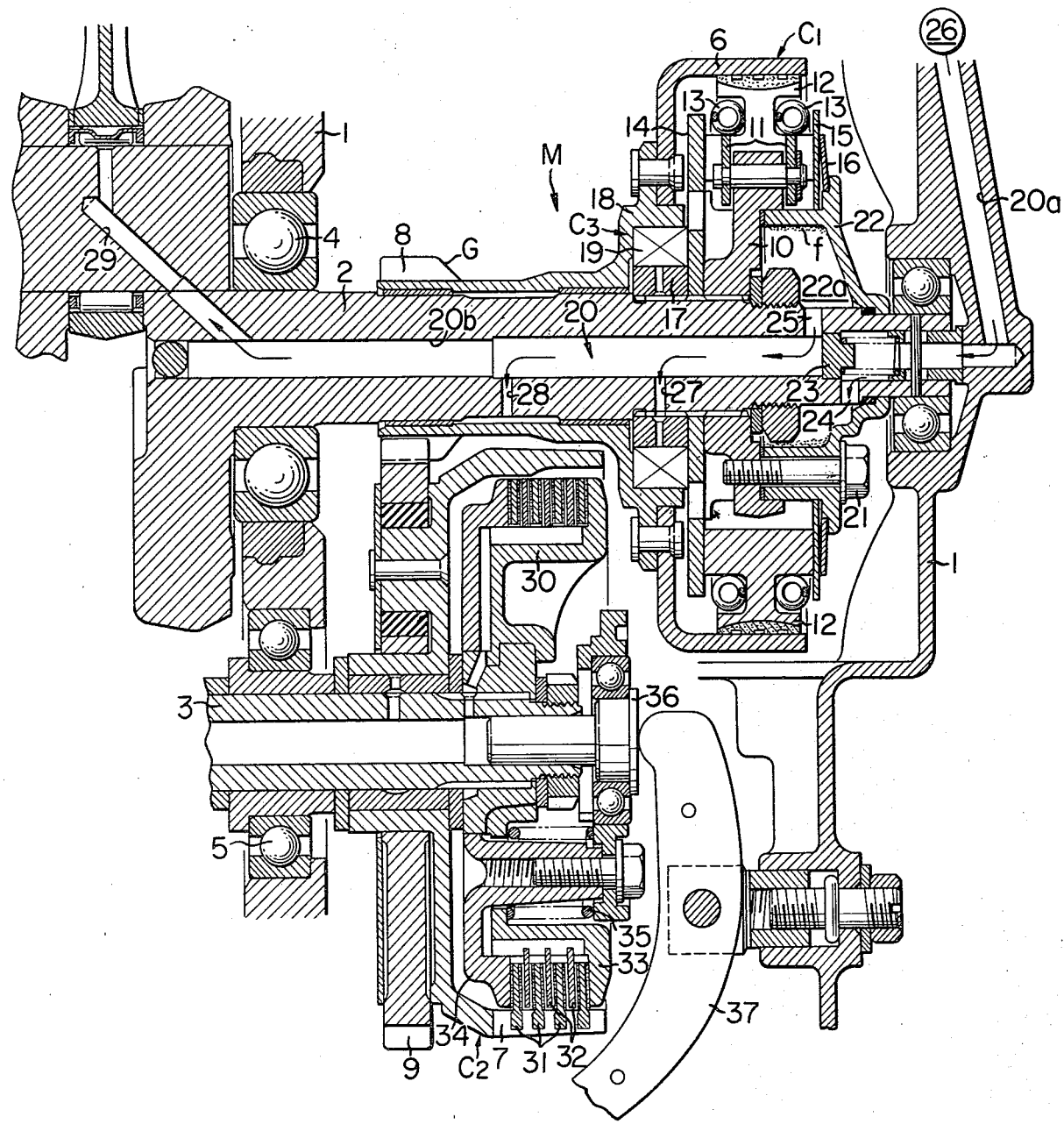
FIG. 2 is a longitudinal sectional view taken along line II—II of FIG. 1.

Referring now to FIGS. 1 and 2, a crank casing 1 of the engine has a crank shaft 2 and a speed change input shaft 3 supported thereon parallel to the shaft 2 through bearings 4 and 5. A transmission device M of the present invention is interposed between both the shafts 2 and 3.

The transmission device M has a centrifugal clutch C1 provided on one end of the crank shaft 2; a speed change clutch C2 provided on one end of the speed change input shaft 3; and a reduction gear train G composed of small and large diameter gears 8 and 9, respectively, connected to a clutch drum 6 as an output member of the centrifugal clutch C1 and to a clutch outer member 7 as an input member to the speed change clutch C2. These elements are arranged close to one another so that the speed change clutch C2 may be interposed between the clutch C1 and the reduction gear train G. With such an arrangement, the transmission device M can be made compact.

As shown in FIG. 1, the centrifugal clutch C1 is partly immersed into lubricating oil L stored at the bottom of the crank casing 1 whereas the speed change clutch C2 is positioned as a whole above the surface of lubricating oil L. In order to obtain such an arrangement as described, it is preferred that the speed change input shaft 3 be positioned at the same level as or higher than the crank shaft 2.

Next, various parts of the transmission device M will be described in detail.

First, the centrifugal clutch has a drive plate 10 as an input member spline-connected to the crank shaft 2, a plurality of clutch shoes 12 connected to the outer peripheral portion of the drive plate 10 through an oscillating link 11 for radial expanding movement, a return spring 13 in the form of an annular coil for biasing the shoes in a contractive direction, and the clutch drum 6 surrounding the clutch shoes 12. A pair of side plates 14 and 15 are disposed adjacent to both sides of the clutch shoes 12 to resiliently hold the clutch shoes 12 by the force of a belleville spring 16 thereby controlling rolling and vibration thereof, while preventing the return spring 13 from being disengaged from the clutch shoes 12.

When the rotational speed of the crank shaft 2 is lower than a predetermined value, the contracting force of the return spring 13 overcomes the centrifugal force of the clutch shoes 12 which rotate along with the drive plate 10 whereby the clutch shoes 12 are maintained in a contracted state and apart from the inner peripheral surface of the clutch drum 6 (the clutch being released). Thus, the crank shaft 2 runs idle, and the turning torque is not transmitted toward the clutch drum 6.

When the rotational speed of the crank shaft 2 is higher then a predetermined value, the centrifugal force of the clutch shoes 12 overcomes the contracting force of the return spring 13 whereby the clutch shoes 12 start their expansive operation to come into contact with the inner peripheral surface of the clutch drum 6. Since the contact pressure between the shoes and the drum increases as the rotational speed of the crank shaft 2 increases, the operating mode of clutch is changed from the half-set state, wherein the clutch shoes 12 suitably skid along the inner peripheral surface of the clutch drum 6, to the set state wherein the shoes come into frictional contact therewith. Thus, the turning torque of the crank shaft 2 is transmitted from the centrifugal clutch C1 to the reduction gear train G in accordance with the rotational speed of the crank shaft 2, and is transmitted therefrom to the speed change input shaft 3 through the speed change clutch C2, and from there it is transmitted to the drive wheels through a speed change gear not shown, to effect smooth starting movement of the vehicle.

A one-way clutch C3 disposed between the clutch drum 6 and the crank shaft 2 is of the conventional type, and has a clutch inner member 17 spline-connected to the crank shaft 2, a clutch outer member 18 fixedly mounted on the clutch drum 6, and rollers (or sprag) 19 for transmitting only the rotation from the clutch outer member 18 to the clutch inner member 17. Only when the inverse load is exerted on the clutch drum 6, do the clutch outer and inner members 18, 17 become connected through the rollers 19, thereby transmitting the inverse load to the crank shaft 2. Thus, even if the starting clutch C1 is released, the engine braking action may be obtained.

A series of oil paths 20 are formed between the crank shaft 2 and the end wall of the crank casing 1 which supports the end of the crank shaft. The oil path 20 is divided by a partitioning plug 23 into an upstream oil path 20a and a downstream oil path 20b so that a centrifugal separating chamber 22a, which is defined in a filter cap 22 secured by means of a bolt 21 to one side of the drive plate 10, is positioned midway of the oil path 20. The upstream oil path 20a is in communication with an inlet hole 24 of the separating chamber 22a, whereas the downstream oil path 20b is in communication with an outlet hole 25 thereof. A lubricating pump 26 for pumping up lubricating oil L stored within the crank casing 1, is connected to the upstream oil path 20a. Small oil paths 27, 28 and 29 are branched from the downstream oil path 20b.

During the running of the engine, the lubricating oil discharged from the lubricating oil pump 26, flows through the upstream oil path 20a into the centrifugal separating chamber 22a. Here, the turning force is received by the lubricating oil from the filter cap 22 to centrifugally separate chips and other foreign elements F. After that the oil is transferred to the downstream oil path 20b, branched into the small oil paths 27, 28 and 29, and fed into the one-way clutch C3, the centrifugal clutch C1, the bearing of the small-diameter gear 8, the crank pin, etc.

Secondly, the speed change clutch C2, which is of the multiple plate type, has a clutch inner member 30 as an output member spline-connected to the speed change input shaft 3, with the clutch outer member 7 surrounding the clutch inner member 30; a plurality of drive frictional plates 31 in slidable spline engagement with the inner peripheral surface of the clutch outer member 7; and a plurality of driven frictional plates 32 superposed alternately therewith and in slidable spline engagement with the outer peripheral surface of the clutch inner member 30. A pressure receiving plate 33 integral with the clutch inner member 30 is adjacent to one side of these frictional plates 31 and 32 whereas an axially retractable pressure plate 34 is adjacent to the other side thereof. The pressure plate 34 is biased toward the pressure receiving plate 33 by means of a clutch spring 35. The pressure plate 34 is provided with a release member 36 slidably supported in the speed change input shaft 3. The release member 36 has a clutch lever 37 operatively connected thereto.

Normally, therefore, the pressure receiving plate 33 and pressure plate 34 cooperate by the force of the clutch spring 35 to hold under pressure the group of frictional plates 31, 32 for providing a frictional connection therebetween, that is, the speed change clutch C2 is maintained in its set state.

When the clutch lever 37 is operated to withdraw the pressure plate 34 against the force of the clutch spring 35 through the release member 36, the frictional plates 31, 32 are separated, so that the clutch C2 is released. At that time, the speed change gear is switched.

As described above, the present invention provides a transmission device M having a centrifugal clutch C1 mounted on a crank shaft 2 of the engine. A multiple plate type speed change clutch C2 is mounted on a speed input shaft 3. There are further provided an output member 6 of the centrifugal clutch C1, and an input member 7 of the speed change clutch C2. The output member 6 is operatively connected to the input member 7 through a reduction gear train G. The speed change clutch is interposed between the centrifugal clutch and the reduction gear train. With this arrangement, dead spaces between various constituting elements of the transmission device M may be removed to make the device compact. In addition, the reduction gear train G may be placed in close proximity of the bearings 4 and 5 of both the shafts 2 and 3 to minimize flexure of the shafts 2 and 3 resulting from the gear transmission. As a consequence, the gear transmission may always be carried out in an effective manner.

Moreover, since the centrifugal clutch C1 involves a large amount of heat generation, it is partly immersed into lubricating oil L. Excellent oil cooling effect may be achieved thereby, ensuring adequate operation of the transmission device and smooth starting of the vehicle at all times. On the other hand, since the speed change clutch C2 is, positioned as a whole, above the surface of lubricating oil, skidding due to excessive adherence of oil to the clutch rarely occurs, and the turning torque increased at the reduction gear train G, can be transmitted to the speed change input shaft 3 efficiently.

Many modifications and variations of the present invention are possible in light of the above teachings. It is, therefore, to be understood that within the scope of the appended claims, the invention may be practiced otherwise than as particularly described.

What is claimed is:

1. A transmission device in a vehicle comprising: a casing; a centrifugal clutch in said casing and mounted on a crank shaft of the engine; a multiple plate type speed change clutch in said casing and mounted on a speed change input shaft; said centrifugal clutch having an output member; said speed change clutch having an input member; said output member being operatively connected to said input member through a reduction gear train; said speed change clutch being interposed between said centrifugal clutch and said reduction gear train; said centrifugal clutch being partly immersed into lubricating oil within said casing, said speed change clutch being totally positioned above the surface of said lubricating oil.

2. A transmission device according to claim 1, wherein said crank shaft is arranged at a level lower than said speed change input shaft.

3. A transmission device according to claim 1, wherein said centrifugal clutch comprises: a drive plate rotated with said crank shaft, a plurality of clutch shoes connected to an outer peripheral portion of said drive plate through an oscillating link for radially expanding movement, a return spring comprising an annular coil for biasing said clutch shoes in a contracting direction, and a clutch drum arranged radially externally of said clutch shoes, whereby when a rotational speed of the crank shaft exceeds a predetermined value, the centrifugal force of said clutch shoes overcomes the contracting force of said return spring so that the clutch shoes expand radially to come into frictional contact with said clutch drum.

4. A transmission device according to claim 3, wherein said starting clutch further comprises a pair of side plates arranged adjacent to both sides of said clutch shoes to resiliently hold said clutch shoes therebetween.

5. A transmission device according to claim 1, wherein said speed change clutch comprises: a clutch inner member axially slidably spline-connected to said speed change input shaft; a clutch outer member arranged radially externally of said clutch inner member and in surrounding relation thereto; a plurality of drive frictional plates in slidable spline engagement with the inner peripheral portion of said clutch outer member; a plurality of driven frictional plates superposed alternately with said drive frictional plates and in slidable spline engagement with the outer peripheral portion of said clutch inner member; a pressure receiving plate arranged adjacent to one side of said drive and driven frictional plates; said pressure receiving plate being formed integral with said clutch inner member; a pressure plate arranged axially retractably adjacent to the other side of said drive and driven frictional plates and biased by a spring toward said pressure receiving plate; a release member connected to said pressure plate and supported axially slidably on said speed change input shaft; and a clutch lever operatively connected to said release member, whereby said release member is slidably moved axially with respect to said speed change input shaft by operation of said clutch lever to move said pressure plate away from said pressure receiving plate thereby releasing the engagement between said drive and driven frictional plates.

6. A transmission device according to claim 3 wherein said reduction gear train comprises: a relatively small diameter gear connected to the clutch drum of said centrifugal clutch and rotatably fitted over said crank shaft; and a relatively large diameter gear connected to the clutch outer member of said speed change clutch and rotatably fitted over said speed change input shaft, said large diameter gear being meshed with said small diameter gear.

7. A transmission device as defined in claim 1, wherein said crank shaft is arranged at a level lower than said speed change input shaft; said centrifugal clutch comprising: a drive plate rotated with said crank shaft, a plurality of clutch shoes connected to an outer peripheral portion of said drive plate through an oscillating link for radially expanding movement, a return spring comprising an annular coil for biasing said clutch shoes in a contracting direction, and a clutch drum arranged radially externally of said clutch shoes, whereby when a rotational speed of the crank shaft exceeds a predetermined value, the centrifugal force of said clutch shoes overcomes the contracting force of said return spring so that the clutch shoes expand radially to come into frictional contact with said clutch drum, said centrifugal clutch having a pair of side plates arranged adjacent to both sides of said clutch shoes to resiliently hold said clutch shoes therebetween.

8. A transmission device as defined in claim 1, wherein said centrifugal clutch comprises: a drive plate rotated with said crank shaft, a plurality of clutch shoes connected to an outer peripheral portion of said drive plate through an oscillating link for radially expanding movement, a return spring comprising an annular coil for biasing said clutch shoes in a contracting direction, and a clutch drum arranged radially externally of said clutch shoes, whereby when a rotational speed of the crank shaft exceeds a predetermined value, the centrifugal force of said clutch shoes overcomes the contracting force of said return spring so that the clutch shoes expand radially to come into frictional contact with said clutch drum; said speed change clutch comprising: a clutch inner member axially slidably spline-connected to said speed change input shaft; a clutch outer member arranged radially externally of said clutch inner member and in surrounding relation thereto; a plurality of drive frictional plates in slidable spline engagement with the inner peripheral portion of said clutch outer member; a plurality of driven frictional plates superposed alternately with said drive frictional plates and in slidable spline engagement with the outer peripheral portion of said clutch inner member; a pressure receiving plate arranged adjacent to one side of said drive and driven frictional plates; said pressure receiving plate being formed integral with said clutch inner member; a pressure plate arranged axially retractably adjacent to the other side of said drive and driven frictional plates and biased by a spring toward said pressure receiving plate; a release member connected to said pressure plate and supported axially slidably on said speed change input shaft; and a clutch lever operatively connected to said release member, whereby said release member is slidably moved axially with respect to said speed change input shaft by operation of said clutch lever to move said pressure plate away from said pressure receiving plate thereby releasing the engagement between said drive and driven frictional plates; said reduction gear train comprising: a relatively small diameter gear connected to the clutch drum of said centrifugal clutch and rotatably fitted over said crank shaft; and a relatively large diameter gear connected to the clutch outer member of said speed change clutch and rotatably fitted over said speed change input shaft, said large diameter gear being meshed with said small diameter gear.

* * * * *